Oct. 9, 1928.
C. F. BETZ
1,686,596
BAKERY MACHINERY
Filed Nov. 21, 1925
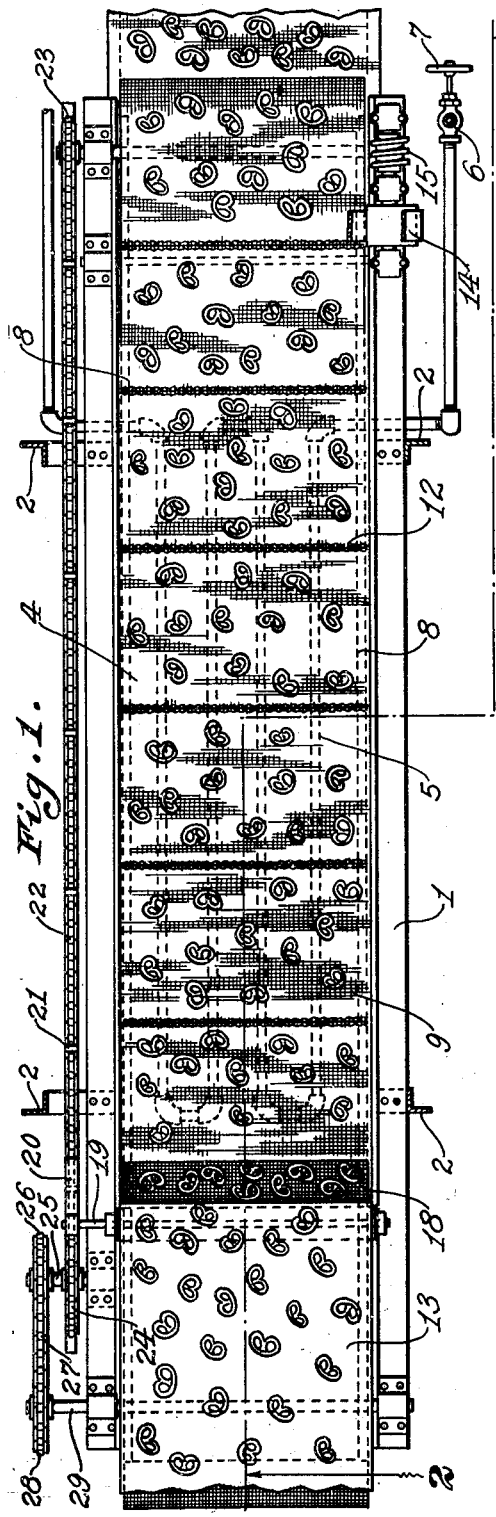
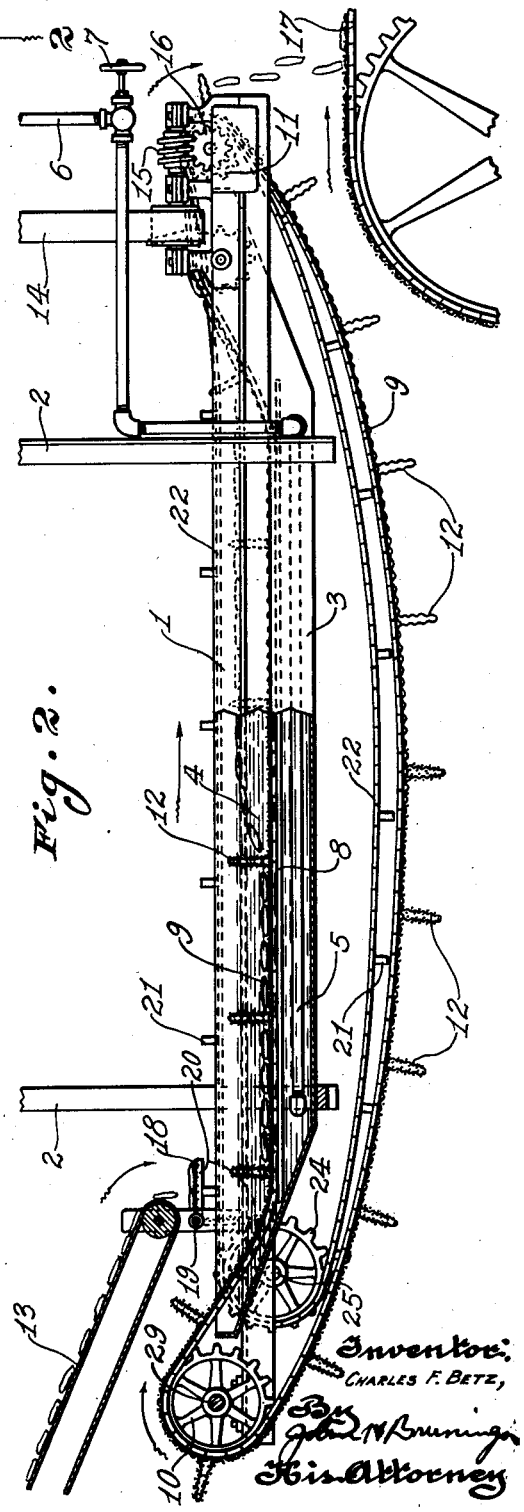
Inventor:
CHARLES F. BETZ,
His Attorney Patented Oct. 9, 1928.

1,686,596

UNITED STATES PATENT OFFICE.

CHARLES F. BETZ, OF ST. LOUIS, MISSOURI.

BAKERY MACHINERY.

Application filed November 21, 1925. Serial No. 70,575.

This invention pertains to bakery machinery and more particularly to apparatus for handling the product to be baked preparatory to the baking operation.

In the manufacture of certain baked products, as for instance in the manufacture of pretzels, the product after being formed is first allowed to "prove" or rise and is then immersed in a bath consisting usually of a weak solution of salt and lye in order to harden the same and to impart to it the desired flavor. After such immersion the product is baked in an oven in the usual way.

One of the objects of this invention is to provide an improved method and apparatus for handling the product to be baked during the immersion in the treating bath.

Another object of this invention is to provide such a method and apparatus in which the handling may be made continuous and automatic and so as to keep pace with other automatic operations of the manufacturing process.

Another object is to provide an apparatus which will handle the product with a minimum of spoilage.

Further objects will appear from the following description taken in connection with the accompanying drawing, in which:

Figure 1 is a plan view of an apparatus embodying this invention and designed to carry out the method thereof; and Figure 2 is a side elevation of the same partly in section.

In accordance with this invention, the pretzels after being formed are dropped into the treating bath. They are then moved along said bath, remaining therein for a time sufficient to insure proper treatment, and are then removed from the bath after which they may be deposited upon suitable conveying apparatus or otherwise transferred to the oven for baking.

Referring to the accompanying drawing, 1 designates a frame which may be supported on suitable supports 2 which, in the case illustrated, are shown as being suspended from the ceiling or other superstructure. The supports 2 may, of course, be arranged to rest upon the ground or be constructed in any other suitable manner adapted to properly support the apparatus. The frame 1 has mounted therein an elongated container or tank 3 adapted to receive the solution 4 forming the treating bath. In the bottom of the tank 3 there is arranged a series of coils 5 to which steam may be admitted from a connection 6 to a suitable source of supply not shown. A valve 7 serves to regulate the supply of steam so as to regulate the temperature of the bath.

Mounted along the sides on the inside of the tank 3 is a pair of rails 8 adapted to support a conveyor 9 which is arranged to slide along said rails through the bath. The conveyor 9 may be constructed in any suitable manner so as to provide a flexible band supported by chains passing over sprockets 10 and 11 at opposite ends of the tank 3. The conveyor is arranged to enter the tank after passing over the sprocket 10, sliding along the rails 8 within the tank and passing out again at the opposite end over the sprocket 11 and thence beneath the tank back to the sprocket 10 as shown in Figure 2. This conveyor is constructed with a body of wire mesh or similar material through which the fluid of the bath may freely pass and from which it will drain readily. At intervals along the conveyor 9 upstanding partitions 12 are arranged. These partitions, while passing through the tank, divide the bath into a series of compartments or pockets adapted to receive the product to be baked. At the same time, the partitions 12 serve as propelling elements to move the product through the bath as the conveyor moves along.

Mounted at the receiving end of the apparatus is a conveyor 13 which may be a simple belt suitably driven by a source of power not shown. The conveyer 9 is driven by a belt 14 on a shaft carrying a worm 15 driving a worm wheel 16 on the shaft of the sprocket 11. The product to be baked is delivered by the conveyor 13 to the bath by simply dropping the articles into the bath and between the partitions 12. In the case of pretzels the same are submerged in the bath when first deposited therein. As the pretzels are heated by the heated bath their buoyancy increases and they rise and float upon the surface. Accordingly, the partitions 12 are made high enough to extend above the surface of the bath so as to move along the floating articles. At the end of the tank 3 the conveyor 9 rises out of the bath and carries the product with it to be deposited upon a conveyor 17 of any suitable type which transfers the product to the oven to be baked.

In order to insure that the articles when delivered to the bath will be deposited in the pocket between the partitions, arrangements are provided for retarding or deflecting the articles during the passage of each partition 12 under the delivery end of the conveyor 13. This is accomplished by a swinging shelf 18 pivoted on a shaft 19 above the tank 3 and just under the delivery end of the conveyor 13. The shaft 19 is provided with an arm 20 adapted to be engaged by a series of plugs or tappets 21 mounted on a chain 22 driven by a sprocket 23 on the end of the shaft of the sprocket 11. This chain is thus driven by the same shaft which drives the conveyor 9 and at the same speed. The tappets 21 are spaced along the chain 22 in such a way that one of these tappets will engage the arm 20 just before a partition 12 passes under the delivery end of the conveyor 13. This tappet will then lift the arm 20 so as to rotate the shaft 19 and lift the swinging shelf 18 to a position to receive the product as it is delivered from the conveyor 13. The shelf remains in this position until the partition has passed thereunder, after which the tappet 21 passes out from under the arm 20 so as to release the same. This permits the shelf 18 to drop and deposit the articles retained thereon in the pocket between two partitions.

The chain 22 is supported at the left hand end Figure 2, by a sprocket 24 on a shaft 25 which carries a second sprocket 26 connected by a chain 27 with a sprocket 28 on the shaft 29 of the sprocket 10. These connections serve to drive the sprocket 10 as well as the sprocket 11. When both sprockets are driven at the same speed a sufficient amount of slack may be allowed in the upper part of the conveyor 9 to permit the same to rest upon the rails 8 while passing through the bath. In this way the conveyor travels in a straight line path during its movement through the bath.

It will be seen, therefore, that this invention provides a simple automatic method for treating the product to be baked in a suitable bath prior to the baking operation. The product is immersed in the solution where it is heated and then rises to float on the bath, after which it is removed from the bath, the solution draining therefrom during removal. The product is then deposited on the conveyor 17 which may take it directly into the oven or to another step in the process of manufacture. The conveyor 9 insures a uniform movement along the bath so that each article remains in the bath for a predetermined period of time so that just the desired treatment may be given. The partitions 12 serve to propel the articles through the bath and prevent accumulation or stacking of the articles in one place on the conveyor. The swinging shelf 18 serves to prevent the articles falling upon the partitions 12 and thereby eliminates the liability of breaking or other damage to the product. The percentage of spoilage is, therefore, reduced to a minimum.

It is obvious that various changes may be made in the details of construction without departing from the spirit of this invention; it is, therefore, to be understood that this invention is not to be limited to the specific details shown and described.

Having thus described the invention, what is claimed is:

1. In a bakery machine of the character described, a container adapted to provide a bath for treating the product to be baked, a conveyor for moving the product through said bath, means on said conveyor for engaging the product to move the same, and a guard for said moving means, adapted to protect said product from breakage during deposition on said conveyor.

2. In a bakery machine of the character described, a container adapted to provide a bath for treating the product to be baked, a conveyor for moving the product through said bath, said conveyor having partitions thereon adapted to provide pockets for receiving the product, and means adapted to feed the product into said pockets including means for deflecting the product so as to avoid said partitions.

3. In a bakery machine of the character described, a container adapted to provide a bath for treating the product to be baked, a conveyor for moving the product through said bath, said conveyor having partitions thereon adapted to provide pockets for receiving the product, and means adapted to feed the product into said pockets including means for retarding the product so as to avoid said partitions.

4. In a bakery machine of the character described, a container adapted to provide a bath for treating the product to be baked, a conveyor for moving the product through said bath, said conveyor having partitions thereon adapted to provide pockets for receiving the product and means adapted to feed the product into said pockets including a movable element adapted to receive the product temporarily in order to avoid said partitions.

5. In a bakery machine of the character described, a container adapted to provide a bath for treating the product to be baked, a conveyor for moving the product through said bath, said conveyor having partitions thereon adapted to provide pockets for receiving the product and means adapted to feed the product into said pockets including a movable element adapted to receive the product temporarily and deposit the same in said pockets.

6. In a bakery machine of the character described, a container adapted to provide a bath for treating the product to be baked, a conveyor for moving the product through said bath, said conveyor having partitions thereon adapted to provide pockets for receiving the product, and means adapted to feed the product into said bath including a movable support adapted to receive the product while one of said partitions passes therebeneath and thereafter to deposit the product in one of said pockets.

7. In a bakery machine of the character described, a container adapted to provide a bath for treating the product to be baked, a conveyor for moving the product through said bath, said conveyor having partitions thereon adapted to provide pockets for receiving the product, means adapted to feed the product into said bath including a movable support, and means operating in timed relation with said conveyor adapted to move said support to a position for receiving the product as each of said partitions passes the feeding point.

8. In a bakery machine of the character described, a container adapted to provide a bath for treating the product to be baked, a conveyor for moving the product through said bath, said conveyor having partitions thereon adapted to provide pockets for receiving the product, means adapted to feed the product into said bath including a swinging shelf, and means operating in timed relation with said conveyor adapted to swing said shelf to a position for receiving the product as each of said partitions passes the feeding point.

9. In the art of baking, the method comprising, forming the product to be baked, submerging the product by its own weight in a treating bath, to prepare same prior to subsequent baking, heating the submerged product in the bath while moving the same along the bath until it rises and floats therein, and removing the product from the bath for baking.

10. In the art of making pretzels, the process comprising, dropping the formed pretzel dough into the treating bath to sink therein, moving the submerged dough along the bath for an extent sufficient to permit the dough to rise therein, and moving the risen dough along the surface of and out of the bath in order that they may be baked.

In testimony wherof I affix my signature this 13th day of October, 1925.

CHARLES F. BETZ.